United States Patent [19]

Ise et al.

[11] Patent Number: 4,985,077

[45] Date of Patent: Jan. 15, 1991

[54] WATERCOLOR INK

[75] Inventors: Osao Ise, Kakogawa; Hideto Kanazawa, Yokohama; Masahiko Ishida, Fujisawa, all of Japan

[73] Assignee: Taiho Industries Co., Ltd., Tokyo, Japan

[21] Appl. No.: 339,593

[22] Filed: Apr. 14, 1989

[30] Foreign Application Priority Data

Apr. 19, 1988 [JP] Japan .................................. 63-94581
Aug. 3, 1988 [JP] Japan ................................ 63-192842

[51] Int. Cl.$^5$ ........................................... C09D 11/00
[52] U.S. Cl. ...................................... 106/22; 568/607
[58] Field of Search ........................... 106/22; 568/607

[56] References Cited

U.S. PATENT DOCUMENTS 4,508,570  4/1985  Fujii et al. ............................ 106/20
4,732,616  3/1988  Kondo et al. ......................... 106/22

FOREIGN PATENT DOCUMENTS 60-23793  6/1985  Japan .
62-15594  4/1987  Japan .
62-164773 7/1987  Japan .

OTHER PUBLICATIONS

Dialog Abstract of JP 56/055468, 5-16-81.

Primary Examiner—William R. Dixon, Jr.
Assistant Examiner—Helene Klemanski
Attorney, Agent, or Firm—Oblon, Spivak, McClelland, Maier & Neustadt

[57] ABSTRACT

A watercolor ink contains a water-soluble dye, water, and at least one benzyl ether represented by the general formulas

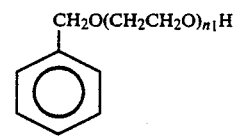

(wherein $n_1$ stands for an integer of 3 to 15) and

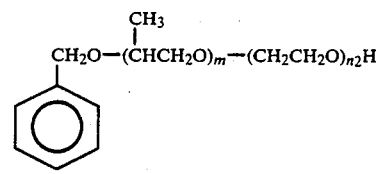

(wherein m stands for an integer of 1 to 15 and $n_2$ for 0 or an integer of 1 to 14, providing that $1 \leq m + n_2 \leq 15$ is satisfied).

2 Claims, No Drawings

WATERCOLOR INK

BACKGROUND OF THE INVENTION

1. Field of the Invention

This invention relates to a watercolor ink most suitable for ink jet printing devices, writing implements, recording meters, and stamping devices. More particularly, this invention relates to a watercolor ink for use in ink jet printing devices, which watercolor ink avoids clogging the ink jet nozzle, jets stably from the nozzle, dries quickly after application to a surface, precludes feathering and strike through, and produces prints of high quality.

2. Prior Art Statement

Ink jet printing is quiet, enables increased printing speed, makes color printing possible, and allows use of plain paper for the printing. These features have encouraged development of this printing system for application to various types of printers and facsimile machines.

In the ink jet printing system, there have been proposed a number of specific printing methods using different combinations ink drop control methods and ink drop jetting methods. Further, both oil color inks and watercolor inks are used in these printing methods. The watercolor ink now in use has a water-soluble dye, a water-soluble organic solvent, and water as essential ingredients.

In the ink jet printing system mentioned above, however, the ink must be jetted continuously and stably in the form of uniform drops through very minute nozzle orifices. The stability of ink drop jetting and the freedom of the nozzle from clogging with the ink are major requirements which the watercolor ink is expected to fulfill.

Further, properties of the watercolor ink which become important after application of the ink to the printing paper are, for example, its drying speed, its strike through and its feathering.

Further, in the ink jet printing system, when plain paper is used, the conventional watercolor ink permeates the paper very slowly and the printing formed by the ink on the surface of the paper does not dry quickly because the ink has high surface tension and the paper has a sizing agent on its surface. Thus, this system prevents use of plain water as the printing paper and requires use of paper having a special surface coating.

To permit use of plain paper for the printing, the method which comprises increasing the alkalinity of the ink and having a sizing agent dissolved in the ink thereby heightening the apparent drying speed of the ink has been proposed. In this case, the problems of strike through and feathering are not entailed. Since the ink has a pH value of not less than 13, however, there is a possible health hazard to humans and color printing is impossible.

It is conceivable to heighten the apparent drying speed of the ink applied to plain paper by incorporating a surfactant in the ink thereby heightening the permeability of the ink through the paper. In this case, the ink entails the problems of strike through and feathering because it has low surface tension and permeates the paper in such a manner as to fill up the interstices in the paper.

For a solution of the problem concerning the clogging of the nozzle orifices with the ink, Japanese Patent Public Disclosure SHO 62-164773 discloses an ink which incorporates therein, in the form of an emulsion, an oily substance insoluble in the essential components of ink. Though this ink solves the problem of clogging, it still suffers from poor solubility and inferior stability because it is an emulsion in state.

For the prevention of the nozzle orifices from the trouble of clogging, Japanese Patent Publication SHO 62-15594 discloses an ink composition which uses diethylene glycol monobenzyl ether in addition to the essential ingredients of ink, i.e. a dye and water. This ink composition, however, is still deficient in stability of continuous jetting at low temperatures (near 5° C.).

In Japanese Patent Publication SHO 60-23793, there is disclosed an ink composition which uses an aliphatic polyhydric alcohol as a wetting agent for the purpose of preventing the nozzle orifices from clogging. This ink composition has a disadvantage in that it entails feathering and strike through and the print formed of the ink composition lacks clarity.

As described above, when the watercolor ink is positively furnished with enough wettability to solve the problem of clogging of the nozzle orifices with the ink, it is compelled to sacrifice quick-drying property and suffers from feathering and strike through. It is very difficult to produce an ink which fulfills all of the requirements.

OBJECT AND SUMMARY OF THE INVENTION

This invention therefore aims to provide a watercolor ink which avoids clogging of the jet nozzles, excels in stability of jetting through the jet nozzles, dries quickly after application to the printing surface of even plain paper, avoids the problems of feathering and strike through, and produces prints of high quality.

To attain the object described above, the present invention provides a watercolor ink comprising a water-soluble dye and water, which watercolor ink is characterized by incorporating therein at least one of the species of benzyl ether represented by the following general formula:

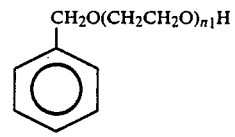

(wherein $n_1$ stands for an integer in the range of 3 to 15) or

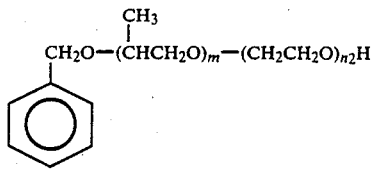

(wherein m stands for an integer in the range of 1 to 15 and $n_2$ for 0 or an integer in the range of 1 to 14, providing that $1 \leq m + n_2 \leq 15$ is satisfied).

Owing to the incorporation of at least one member selected from among polyoxyethylene benzyl ethers and polyoxyethylene-polyoxypropylene benzyl ethers in the ink composition as described above, the ink consequently obtained avoids clogging the jet nozzles, dries quickly after application to a surface, entails little or no strike through and little or no feathering, and produces prints of high quality.

The other objects and characteristic features of this invention will become apparent from the description to be given in further detail hereinafter.

DETAILED DESCRIPTION OF THE PREFERRED EMBODIMENT

The inventors have found that when a polyoxyethylene benzyl ether or a polyoxyethylenepolyoxypropylene benzyl ether is incorporated in a watercolor ink, it enables the ink to be stably jetted through the jet nozzles without entraining any bubbles during the course of ink jet printing, improves the solubility of the dye in the ink, and allows the ink to acquire sufficient power to permeate the paper without any sacrifice of surface tension. The present invention has been perfected as a result.

The water-soluble dyes which are usable for this invention include direct dyes and acid dyes, particularly those which show satisfactory resolubility to water-soluble organic solvents and enhance the water-proofness and weatherability of images to be obtained by printing. As examples of these dyes, the following may be mentioned.

| C.I. Direct Black | #17, #19, #38, #108, #154 |
| C.I. Acid Black | #2, #7, #31, #94, #155 |
| C.I. Direct Blue | #2, #6, #25, #98, #194 |
| C.I. Acid Blue | #7, #9, #104, #167, #234 |
| C.I. Direct Red | #1, #9, #17, #28, #99 |
| C.I. Acid Red | #18, #52, #94, #143, #259 |
| C.I. Direct Yellow | #8, #27, #58, #86, #142 |
| C.I. Acid Yellow | #7, #17, #42, #65, #155 |

The amount of the water-soluble dye to be added is selected within the range not exceeding the upper limit of 9 wt %, with due consideration paid to the solution and precipitation of the dye after addition to the other ingredients of the ink.

To the water-soluble dye mentioned above, are added a polyoxyethylene benzyl ether of the following structural formula (1) and/or a polyoxyethylenepolyoxypropylene benzyl ether of the following structural formula (2).

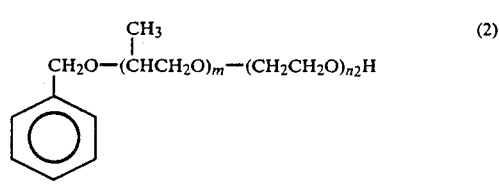

$$CH_2O(CH_2CH_2O)_{n_1}H \quad (1)$$

(wherein $n_1$ stands for an integer in the range of 3 to 15) or

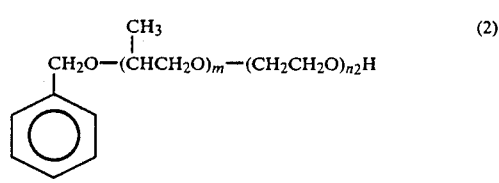

$$CH_2O-(\overset{CH_3}{\underset{|}{C}HCH_2O})_m-(CH_2CH_2O)_{n_2}H \quad (2)$$

(wherein m stands for an integer in the range of 1 to 15 and $n_2$ for 0 or an integer in the range of 1 to 14, providing that $1 \leq m+n_2 \leq 15$ is satisfied).

The amount of the aforementioned benzyl ether to be added to the ink is desired to be in the range of 1.0 to 20% by weight. If this amount is less than 1.0% by weight, the ink is deficient in the power to permeate the paper and is slow in drying after application to the printing paper. If the amount exceeds 20% by weight, no proportionate increase is obtained in the ink's power to penetrate the paper. The excess of benzyl ether goes to heighten the viscosity of the ink, possibly to an extent of adversely affecting the stability of ink jetting through the jet nozzle during the course of ink jet printing.

This invention is not limited to the use of only one benzyl ether. A mixture of two or more benzyl ethers of the structural formulas (1) and (2) may be used jointly as occasion demands.

If the addition mol number $n_1$ of ethylene oxide of the aforementioned structural formula (1) is 2 or less, the stability of solution of the ink may be possibly impaired, depending on the kind or the amount of dye added. If this number $n_1$ is not less than 16, the benzyl ether dissolved in the ink heightens the viscosity of the ink so much as to impair the stability of ink jetting through the jet nozzles.

In the case of the benzyl ether of the aforementioned structural formula (2), if $m \leq n_2$, then the added benzyl ether contributes to the stability of solution of the ink and imparts to the ink a sufficient power to permeate the paper. If $m > n_2$, the added benzyl ether may possibly impair the stability of the ink, depending on the kind and the amount of the dye added. When the benzyl ether of $m > n_2$ is used in combination with other benzyl ether of $m \leq n_2$ or with a surfactant, the ink composition consequently produced acquires highly satisfactory stability and sufficient power to permeate the paper. If the benzyl ether satisfies $m+n_2 \geq 16$, this benzyl ether dissolved in the ink increases the viscosity of the ink to an extent of impairing the stability of ink jetting through the jet nozzles and even degrading the ink's power to permeate the paper.

To the aforementioned essential ink ingredients, a water-soluble organic solvent is added in an amount not exceeding 40% by weight for the purpose of adjusting the viscosity of the ink and ensuring the stability of discharge and the low-temperature stability.

The water-soluble organic solvents which are usable for this invention include polyhydric alcohols such as ethylene glycol, di- or tri- or polyethylene glycol, propylene glycol, dipropylene glycol, hexylene glycol, glycerin, and polyglycerin, alkyl ethers of polyhydric alcohols and acetates thereof such as ethylene glycol monomethyl ether, ethylene glycol monoethyl ether, ethylene glycol monobutyl ether, diethylene glycol monomethyl ether, diethylene glycol monoethyl ether, diethylene glycol monoethyl ether, diethylene glycol monobutyl ether, diethylene glycol dimethyl ether, triethylene glycol monoethyl ether, propylene glycol monomethyl ether, propylene glycol monoethyl ether, ethylene glycol monomethyl ether acetate, ethylene glycol monoethyl ether acetate, and glycerin monoacetate, and nitrogen compounds such as amino alcohols, N-methyl-2pyrrolidone and 1,3-dimethyl imidazoline, for example. One member or a mixture of two or more members selected from among those enumerated above may be used.

It is generally known that the watercolor ink further incorporates therein an oily substance for the purpose of widening the range of selection of the printing paper, improving the absorbability of the ink in the paper, and aiding the dye in acquiring improved solubility. The oily substances which are usable in this invention include vegetable oils, unsaturated fatty acids, higher alcohols, fatty acid esters, and mineral oils, for example. All of these ingredients are emulsified as with a surfactant to produce an ink in the form of emulsion. They may be otherwise solubilized as with a surfactant or any of various solvents to prepare a watercolor ink. The ink which has incorporated therein the oily substance mentioned above, however, disadvantageously has extremely poor stability and excessive viscosity.

As a substance capable of relieving the oily substance-containing ink of the drawbacks mentioned above and allowing the ink to retain the characteristics peculiar to the incorporation of the oily substance, a solvent which possesses an -OH group in the molecular unit thereof and is either insoluble or sparingly soluble in water may be cited. Concrete examples of the solvent of this description are 2-ethyl-1,6-hexane diol, diethylene glycol hexyl ether, ethylene oxide adducts (addition mol number not more than 5) of acetylene glycol, and ethylene glycol benzyl ether. This solvent is incorporated in the watercolor ink in an amount in the range of 0.1 to 10.0% by weight, enabling the oily substance-containing ink to retain the special characteristics and exhibit satisfactory stability. Of course, the solution of this solvent in water necessitates additional use of a water-soluble organic solvent because it is insoluble or only sparingly soluble in water. In this case, the benzyl ether contemplated by the present invention functions very effectively as an agent for aiding the solution of the solvent in water.

In addition to the aforementioned ingredients, the watercolor ink of this invention may incorporate therein a surfactant, a moisture-retaining agent, a fungicide, etc. in amounts which do not impair the characteristic properties of the ink.

In short, the watercolor ink of this invention possesses a sufficient power to permeate the fibers of paper in spite of its high surface tension because this ink contains the benzyl ether of the aforementioned structural formula. Thus, the watercolor ink is not affected by the sizing agent used on the surface of paper. When the ink is applied to the surface of the paper, it exhibits the wetting property responsible for diffusion only to a repressed extent and is allowed to permeate to the interior of the paper but is precluded from suddenly permeating the interstices in the interior of paper.

The watercolor ink of this invention, therefore, dries as quickly on plain paper as on the printing paper produced exclusively for use in the ink jet printing system and avoids causing feathering and strike through and permits production of prints of high quality.

Further, the present invention promotes the solubility of the dye in the ink, precludes the problem of clogging of the jet nozzles with dye precipitating from the ink and, at the same time, ensures stable discharge of the ink through the jet nozzles. It accordingly satisfies the need for increased operating speed in ink jet printing devices.

The watercolor ink of the present invention can be used not only in ink jet printing devices but also in writing implements, recording meters, and stamping devices, for example.

Now, the present invention will be described more specifically below with reference to examples. It should be noted that this invention is not limited to these examples.

EXAMPLE

Formulations 1 to 12 represent ink compositions incorporating benzyl ethers of the structural formula (1) and Formulations 13 to 22 those incorporating benzyl ethers of the structural formula (2) and Formulations 23 and 24 those incorporating benzyl ethers of the structural formulas (1) and (2) jointly.

| Formulation 1: | |
|---|---|
| C. I. Direct Black #19 | 2.0 wt. % |
| Glycerin | 10.0 |
| Diethyl glycol | 5.0 |
| Sodium dehydroacetate | 0.1 |
| Benzyl ether ($n_1 = 5$) | 5.0 |
| Ion-exchanged water | Balance |
| Formulation 2: | |
| C. I. Acid Blue #234 | 2.0 wt. % |
| PEG #200 | 8.0 |
| Diethylene glycol monoethyl ether | 5.0 |
| Sodium dehydroacetate | 0.1 |
| Benzyl ether ($n_1 = 8$) | 5.0 |
| Ion-exchanged water | Balance |
| Formulation 3: | |
| C. I. Direct Yellow #142 | 2.0 wt. % |
| PEG #300 | 10.0 |
| Polyoxyethylene alkyl ether | 1.0 |
| Sodium dehydroacetate | 0.1 |
| Benzyl ether ($n_1 = 3$) | 4.0 |
| Ion-exchanged water | Balance |
| Formulation 4: | |
| C. I. Acid Black #94 | 2.0 wt. % |
| Diethylene glycol monobutyl ether acetate | 2.0 |
| Propylene glycol | 8.0 |
| N-methyl-2-pyrrolidone | 5.0 |
| Sodium dehydroacetate | 0.1 |
| Benzyl ether ($n_1 = 14$) | 3.0 |
| Ion-exchanged water | Balance |
| Formulation 5: | |
| C. I. Direct Red #28 | 2.0 wt. % |
| Benzyl alcohol | 1.0 |
| Glycerin | 10.0 |
| Sodium dehydroacetate | 0.1 |
| Benzyl ether ($n_1 = 15$) | 6.0 |
| Ion-exchanged water | Balance |
| Formulation 6: | |
| C. I. Acid Yellow #65 | 2.0 wt. % |
| Ethylene glycol monobenzyl ether | 2.0 |
| PEG #200 | 10.0 |
| Sodium dehydroacetate | 0.1 |
| Benzyl ether ($n_1 = 7$) | 5.0 |
| Ion-exchanged water | Balance |
| Formulation 7: | |
| C. I. Direct Black #19 | 2.0 wt. % |
| Acetylene glycol | 0.2 |
| Glycerin | 10.0 |
| Sodium dehydroacetate | 0.1 |
| Benzyl ether ($n_1 = 8$) | 8.0 |
| Ion-exchanged water | Balance |
| Formulation 8: | |
| C. I. Acid Blue #234 | 2.0 wt. % |
| 2-Ethyl-1,3-hexane diol | 1.0 |
| PEG #200 | 10.0 |
| Sodium dehydroacetate | 0.1 |
| Benzyl ether ($n_1 = 12$) | 6.0 |
| Ion-exchanged water | Balance |
| Formulation 9: | |
| C. I. Direct Yellow #142 | 2.0 wt. % |
| Glycerin | 10.0 |
| Diethylene glycol hexyl ether | 0.5 |
| Sodium dehydroacetate | 0.1 |
| Benzyl ether ($n_1 = 5$) | 4.0 |
| Benzyl ether ($n_1 = 13$) | 4.0 |
| Ion-exchanged water | Balance |
| Formulation 10: | |
| C. I. Acid Black #94 | 2.0 wt. % |
| Diethylene glycol | 10.0 |
| Acetylene glycol EO adduct | 5.0 |
| Sodium dehydroacetate | 0.1 |

| | |
|---|---|
| Benzyl ether ($n_1 = 10$) | 5.0 |
| Ion-exchanged water | Balance |
| Formulation 11: | |
| C. I. Direct Black #154 | 2.0 wt. % |
| PEG #300 | 0.5 |
| Sodium dehydroacetate | 0.1 |
| Benzyl ether ($n_1 = 4$) | 18.0 |
| Ion-exchanged water | Balance |
| Formulation 12: | |
| C. I. Direct Red #99 | 2.0 wt. % |
| Diethylene glycol | 38.0 |
| Sodium dehydroacetate | 0.1 |
| Benzyl ether ($n_1 = 6$) | 2.0 |
| Ion-exchanged water | Balance |
| Formulation 13: | |
| C. I. Direct Black #19 | 2.0 wt. % |
| Glycerin | 10.0 |
| Diethyl glycol | 5.0 |
| Sodium dehydroacetate | 0.1 |
| Benzyl ether ($m = 2$, $n_2 = 4$) | 5.0 |
| Ion-exchanged water | Balance |
| Formulation 14: | |
| C. I. Acid Blue #234 | 2.0 wt. % |
| PEG #200 | 8.0 |
| Diethylene glycol monoethyl ether | 5.0 |
| Sodium dehydroacetate | 0.1 |
| Benzyl ether ($m = 2$, $n_2 = 2$) | 5.0 |
| Ion-exchanged water | Balance |
| Formulation 15: | |
| C. I. Direct Yellow #142 | 2.0 wt. % |
| PEG #300 | 10.0 |
| Polyoxyethylene alkyl ether | 1.0 |
| Sodium dehydroacetate | 0.1 |
| Benzyl ether ($m = 4$, $n_2 = 1$) | 4.0 |
| Ion-exchanged water | Balance |
| Formulation 16: | |
| C. I. Acid Black #94 | 2.0 wt. % |
| Diethylene glycol monobutyl ether acetate | 2.0 |
| Propylene glycol | 7.0 |
| N-methyl-2-pyrrolidone | 5.0 |
| Sodium dehydroacetate | 0.1 |
| Benzyl ether ($m = 1$, $n_2 = 12$) | 3.0 |
| Benzyl ether ($m = 12$, $n_2 = 2$) | 1.0 |
| Ion-exchanged water | Balance |
| Formulation 17: | |
| C. I. Direct Red #28 | 2.0 wt. % |
| Benzyl alcohol | 1.0 |
| Glycerin | 10.0 |
| Sodium dehydroacetate | 0.1 |
| Benzyl ether ($m = 5$, $n_2 = 10$) | 6.0 |
| Ion-exchanged water | Balance |
| Formulation 18: | |
| C. I. Acid Yellow #65 | 2.0 wt. % |
| Ethylene glycol monobenzyl ether | 2.0 |
| PEG #200 | 10.0 |
| Sodium dehydroacetate | 0.1 |
| Benzyl ether ($m = 2$, $n_2 = 6$) | 5.0 |
| Ion-exchanged water | Balance |
| Formulation 19: | |
| C. I. Acid Blue #234 | 2.0 wt. % |
| 2-Ethyl-1,3-hexane diol | 1.0 |
| PEG #200 | 10.0 |
| Sodium dehydroacetate | 0.1 |
| Benzyl ether ($m = 4$, $n_2 = 8$) | 6.0 |
| Ion-exchanged water | Balance |
| Formulation 20: | |
| C. I. Direct Yellow #142 | 2.0 wt. % |
| Glycerin | 10.0 |
| Diethylene glycol hexyl ether | 0.5 |
| Sodium dehydroacetate | 0.1 |
| Benzyl ether ($m = 1$, $n_2 = 1$) | 4.0 |
| Benzyl ether ($m = 3$, $n_2 = 6$) | 4.0 |
| Ion-exchanged water | Balance |
| Formulation 21: | |
| C. I. Acid Black #94 | 2.0 wt. % |
| Diethylene glycol | 8.0 |
| Acetylene glycol EO adduct | 2.0 |
| Sodium dehydroacetate | 0.1 |
| Benzyl ether ($m = 2$, $n_2 = 5$) | 10.0 |
| Ion-exchanged water | Balance |
| Formulation 22: | |
| C. I. Direct Black #154 | 2.0 wt. % |
| Diethylene glycol monoethyl ether | 2.0 |
| Sodium dehydroacetate | 0.1 |
| Benzyl ether ($m = 1$, $n_2 = 7$) | 18.0 |
| Ion-exchanged water | Balance |
| Formulation 23: | |
| C. I. Direct Blue #194 | 2.0 wt. % |
| Diethylene glycol | 5.0 |
| Sodium dehydroacetate | 0.1 |
| Polyoxyethylene benzyl ether ($n_1 = 3$) | 10.0 |
| Polyoxypropylene polyoxyethylene benzyl ether ($m = 3$, $n_2 = 10$) | 5.0 |
| Ion-exchanged water | Balance |
| Formulation 24: | |
| C. I. Direct Blue #194 | 2.0 wt. % |
| 1,3-Dimethyl imidazoline | 2.0 |
| Polyoxyethylene benzyl ether ($n_1 = 8$) | 5.0 |
| Polyoxypropylene polyoxyethylene benzyl ether ($m = 2$, $n_2 = 4$) | 10.0 |
| Sodium dehydroacetate | 0.1 |
| Ion-exchanged water | Balance |
| Comparative formulation 1: | |
| C. I. Direct Black #19 | 2.0 wt. % |
| PEG #200 | 12.0 |
| Diethylene glycol | 6.0 |
| Sodium dehydroacetate | 0.1 |
| Ion-exchanged water | Balance |
| Comparative formulation 2: | |
| C. I. Acid Blue #234 | 2.0 wt. % |
| Glycerin | 12.0 |
| Diethylene glycol monoethyl ether | 5.0 |
| Sodium dehydroacetate | 0.1 |
| Ion-exchanged water | Balance |
| Comparative formulation 3: | |
| C. I. Direct Red #99 | 2.0 wt. % |
| Glycerin | 15.0 |
| Polyoxyethylene benzyl ether ($n_1 = 8$) | 0.5 |
| Sodium dehydroacetate | 0.1 |
| Ion-exchanged water | Balance |
| Comparative formulation 4: | |
| C. I. Acid Blue #234 | 2.0 wt. % |
| Glycerin | 10.0 |
| Polyoxyethylene benzyl ether ($n_1 = 2$) | 8.0 |
| Sodium dehydroacetate | 0.1 |
| Ion-exchanged water | Balance |
| Comparative formulation 5: | |
| C. I. Direct Yellow #142 | 2.0 wt. % |
| PEG #200 | 10.0 |
| Sodium dehydroacetate | 0.1 |
| Polyoxyethylene benzyl ether ($n_1 = 18$) | 10.0 |
| Ion-exchanged water | Balance |
| Comparative formulation 6: | |
| C. I. Direct Red #28 | 2.0 wt. % |
| PEG #300 | 15.0 |
| Sodium dehydroacetate | 0.1 |
| Sodium dioctylsulfosuccinate | 2.0 |
| Ion-exchanged water | Balance |
| Comparative formulation 7: | |
| C. I. Direct Black #154 | 1.2 wt. % |
| Diethylene glycol monobenzyl ether | 5.0 |
| Sodium benzoate | 1.0 |
| Ion-exchanged water | Balance |
| Comparative formulation 8: | |
| C. I. Direct Red #28 | 2.0 wt. % |
| Sodium dehydroacetate | 0.1 |
| Polyoxypropylene polyoxyethylene benzyl ether ($m = 2$, $n_2 = 6$) | 25 |
| Ion-exchanged water | Balance |
| Comparative formulation 9: | |
| C. I. Direct Yellow #142 | 2.0 wt. % |
| PEG #200 | 10.0 |
| Sodium dehydroacetate | 0.1 |
| Polyoxypropylene polyoxyethylene benzyl ether ($m = 7$, $n_2 = 9$) | 10.0 |
| Ion-exchanged water | Balance |

The ingredients of Formulations 1 to 24 and those of Comparative Formulations 1 to 9 were mixed, suction filtered through a membrane filter 0.45μ in pore diameter, and then deaerated under a vacuum, to produce inks.

These inks were each subjected to various types of trial printing by the use of a drop-on-demand type ink jet printing device under the conditions of 2 KHz of frequency, 80V of pulse voltage, and 60μ of nozzle diameter, to determine the stability of continuous jetting, jetting response and drying property of prints of ink formed by the printing.

(1) Stability of continuous jetting In a 48-hour continuous jetting test in a constant temperature room at 5° C., 20° C., and 40° C., the inks of Formulations 1 to 24 and Comparative Formulations 1 to 3 all produced clear prints stably and the inks of Comparative Formulations 4 and 7 caused clogging of the jet orifices at 5° C. and those of Comparative Formulations 5, 8, and 9 caused clogging of jet orifices at 5° C. and 20° C. In the test, the ink of Comparative Formulation 6 caused clogging of jet nozzles possibly owing to entrainment of bubbles at all of the temperatures. (2) Jetting response In a jetting response test of a sample ink through the jet nozzles conducted by a procedure comprising intermittent jetting at 15-minute intervals followed by four weeks of standing at rest, the inks of formulations 1 to 24 and Comparative Formulations 1 to 3 all produced clear prints with the same stability as in the normal state of printing, without entailing clogging of the jet nozzles or any other similar adverse phenomenon, while the inks of comparative Formulations 4 to 9 suffered instabile jetting and produced printed characters in discontinuous strokes after four weeks' standing at rest.

(3) Drying property of prints formed using the ink

Prints formed by printing a sample ink on four kinds of printing paper (A-4 folio), i.e. ink jet quality printing paper (silica-coated paper), handwriting quality paper A (letter paper conforming to the specification of JIS [Japanese Industrial Standard]P3201), handwriting quality paper B (office paper conforming to the specification of JIS P3202), and handwriting quality paper C (notebook paper conforming to the specification of JIS P3203), were tested for drying property by the following methods.

(a) Transfer method

Prints of a sample ink were formed on the four papers mentioned above by the use of an ink jet printer. After elapse of 10 seconds, 30 seconds, and 60 seconds, the printed surfaces of the papers were kept pressed by respectively identical papers for one minute. The joined papers were separated and then examined to determine whether or not the mutual pressure of the paper surfaces caused transfer of prints. The mutual pressure of the paper surfaces was effected by following the procedure of drying test specified for water base marking pens in JIS S 6038, with necessary modifications. The results of the test were as shown in Table 1.

TABLE 1

| | Ink jet quality printing paper | Handwriting quality paper A | B | C |
|---|---|---|---|---|
| Formulation | | | | |
| 1 | ⊚ | ⊚ | o | ⊚ |
| 2 | ⊚ | ⊚ | o | ⊚ |
| 3 | ⊚ | ⊚ | o | ⊚ |
| 4 | ⊚ | ⊚ | o | ⊚ |
| 5 | ⊚ | ⊚ | o | ⊚ |
| 6 | ⊚ | ⊚ | o | ⊚ |
| 7 | ⊚ | ⊚ | o | ⊚ |
| 8 | ⊚ | ⊚ | o | ⊚ |
| 9 | ⊚ | ⊚ | o | ⊚ |
| 10 | ⊚ | ⊚ | o | ⊚ |
| 11 | ⊚ | ⊚ | o | ⊚ |
| 12 | ⊚ | ⊚ | o | ⊚ |
| 13 | ⊚ | ⊚ | o | o |
| 14 | ⊚ | ⊚ | o | ⊚ |
| 15 | ⊚ | ⊚ | o | ⊚ |
| 16 | ⊚ | ⊚ | o | ⊚ |
| 17 | ⊚ | ⊚ | o | ⊚ |
| 18 | ⊚ | ⊚ | o | ⊚ |
| 19 | ⊚ | ⊚ | o | ⊚ |
| 20 | ⊚ | ⊚ | o | ⊚ |
| 21 | ⊚ | ⊚ | o | ⊚ |
| 22 | ⊚ | ⊚ | o | ⊚ |
| 23 | ⊚ | ⊚ | o | ⊚ |
| 24 | ⊚ | ⊚ | o | ⊚ |
| Comparative Formulation | | | | |
| 1 | ⊚ | x | x | x |
| 2 | ⊚ | Δ | x | x |
| 3 | ⊚ | o | Δ | x |
| 4 | ⊚ | ⊚ | ⊚ | ⊚ |
| 5 | ⊚ | o | o | o |
| 6 | ⊚ | ⊚ | ⊚ | ⊚ |
| 7 | ⊚ | ⊚ | ⊚ | ⊚ |
| 8 | ⊚ | o | o | o |
| 9 | ⊚ | ⊚ | ⊚ | ⊚ |

In the table shown above, the mark ⊚ denotes a printed paper which showed no transfer of print when the mutual pressure of the paper surfaces was started 10 seconds after printing, the mark ○ a printed paper which showed transfer of print when the mutual pressure was started 10 seconds after printing and showed no transfer of print when the mutual pressure was started 30 seconds after printing, the mark Δ a printed paper which showed transfer of print when the mutual pressure was started 30 seconds after printing and showed no transfer of print when the mutual pressure was started 60 seconds after printing, and the mark x a printed paper which still showed transfer of print when the mutual pressure was started after 60 seconds after printing.

(b) Friction method

The printed surface of a given paper fresh from (one to two seconds after) printing with the ink jet printer was rubbed with a finger tip and then examined to determine the effect of friction upon the print. The results were as shown in Table 2.

TABLE 2

| | Ink jet quality printing paper | Handwriting quality paper A | B | C |
|---|---|---|---|---|
| Formulation | | | | |
| 1 | o | o | o | o |
| 2 | o | o | o | o |
| 3 | o | o | o | o |
| 4 | o | o | o | o |
| 5 | o | o | o | o |
| 6 | o | o | o | o |
| 7 | o | o | o | o |
| 8 | o | o | o | o |
| 9 | o | o | o | o |
| 10 | o | o | o | o |
| 11 | o | o | o | o |
| 12 | o | o | o | Δ |
| 13 | o | o | o | o |
| 14 | o | o | o | o |
| 15 | o | o | o | o |
| 16 | o | o | o | o |

TABLE 2-continued

| | Ink jet quality printing paper | Handwriting quality paper | | |
|---|---|---|---|---|
| | | A | B | C |
| 17 | o | o | o | o |
| 18 | o | o | o | o |
| 19 | o | o | o | o |
| 20 | o | o | o | o |
| 21 | o | o | o | o |
| 22 | o | o | o | o |
| 23 | o | o | o | o |
| 24 | o | o | o | o |
| Comparative Formulation | | | | |
| 1 | o | x | x | x |
| 2 | o | x | x | x |
| 3 | o | Δ | x | x |
| 4 | o | Δ | Δ | Δ |
| 5 | o | Δ | x | x |
| 6 | o | Δ | Δ | Δ |
| 7 | o | o | o | Δ |
| 8 | o | Δ | Δ | x |
| 9 | o | Δ | Δ | Δ |

In the table shown above, the mark denotes complete absence of change, the mark Δ presence of slight smudging, and the mark x complete smudging.

Then images were printed on the four papers by the use of the ink jet printer and examined to determine possible feathering and strike through of ink from the printed images and evaluate the image quality. The results on feathering were as shown in Table 3 and those on strike through as shown in Table 4.

TABLE 3

| | Ink jet quality printing paper | Handwriting quality paper | | |
|---|---|---|---|---|
| | | A | B | C |
| Formulation | | | | |
| 1 | o | o | o | o |
| 2 | o | o | o | o |
| 3 | o | o | o | o |
| 4 | o | o | o | Δ |
| 5 | o | o | o | Δ |
| 6 | o | o | o | o |
| 7 | o | o | o | o |
| 8 | o | o | o | o |
| 9 | o | o | o | o |
| 10 | o | o | o | o |
| 11 | o | o | o | Δ |
| 12 | o | o | o | o |
| 13 | o | o | o | o |
| 14 | o | o | o | o |
| 15 | o | o | o | o |
| 16 | o | o | o | Δ |
| 17 | o | o | o | o |
| 18 | o | o | o | o |
| 19 | o | o | o | o |
| 20 | o | o | o | o |
| 21 | o | o | o | o |
| 22 | o | o | o | o |
| 23 | o | o | o | Δ |
| 24 | o | o | o | o |
| Comparative Formulation | | | | |
| 1 | o | Δ | x | x |
| 2 | o | x | x | x |
| 3 | o | Δ | x | x |
| 4 | o | o | Δ | Δ |
| 5 | o | Δ | Δ | Δ |
| 6 | o | x | x | x |
| 7 | o | o | Δ | Δ |
| 8 | o | Δ | Δ | Δ |
| 9 | o | Δ | Δ | Δ |

TABLE 4

| | Ink jet quality printing paper | Handwriting quality paper | | |
|---|---|---|---|---|
| | | A | B | C |
| Formulation | | | | |
| 1 | o | o | o | o |
| 2 | o | o | o | o |
| 3 | o | o | o | o |
| 4 | o | o | o | o |
| 5 | o | o | o | Δ |
| 6 | o | o | o | o |
| 7 | o | o | o | o |
| 8 | o | o | o | o |
| 9 | o | o | o | o |
| 10 | o | o | o | o |
| 11 | o | o | o | o |
| 12 | o | o | o | o |
| 13 | o | o | o | o |
| 14 | o | o | o | o |
| 15 | o | o | o | o |
| 16 | o | o | o | o |
| 17 | o | o | o | o |
| 18 | o | o | o | Δ |
| 19 | o | o | o | o |
| 20 | o | o | o | o |
| 21 | o | o | o | o |
| 22 | o | o | o | o |
| 23 | o | o | o | o |
| 24 | o | o | o | o |
| Comparative Formulation | | | | |
| 1 | o | o | o | o |
| 2 | o | o | o | o |
| 3 | o | o | o | o |
| 4 | o | Δ | Δ | o |
| 5 | o | o | o | o |
| 6 | x | x | x | x |
| 7 | o | Δ | Δ | Δ |
| 8 | o | o | o | o |
| 9 | o | o | o | Δ |

In Table 3 and Table 4, the mark denotes substantial absence of feathering or strike through of ink, the mark Δ presence of slight feathering or strike through, and the mark x presence of heavy feathering or strike through.

It is clear from the test results given above that the conventional watercolor inks (Comparative Formulations 1 and 2), though virtually satisfactory in stability of continuous jetting and jetting response, produced satisfactory results in terms of drying property of print on the ink jet quality paper and caused substantially no transfer of print on the handwriting quality papers, that the ink of repressed surface tension and enhanced power of permeation (Comparative Formulation 6) was deficient in stability of continuous jetting and jetting response and dried quickly but induced heavy feathering on the handwriting quality papers, and that the inks conforming to the present invention were highly satisfactory in stability of continuous jetting and jetting response, exhibited an outstanding quick-drying property, avoided inducing appreciable feathering or strike through of ink, and produced print of highly satisfactory quality on the ink jet quality paper and the handwriting quality papers.

What is claimed is:

1. A watercolor ink, comprising:
   a water-soluble dye; water; 1.0–20% by weight, based on the total amount of said watercolor ink of a benzyl ether of the formula:

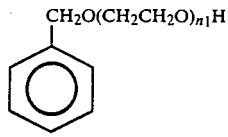

wherein $n_1$ is an integer within the range of 3–15, or the formula:

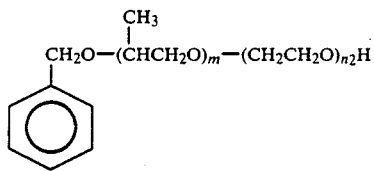

wherein m is an integer within the range of 1–15 and $n_2$ is 0 or an integer in the range of 1–14, provided that $1 \leq m+n_2 \leq 15$ is satisfied; a water-soluble organic solvent; and 0.1 to 10.0% by weight of a second solvent containing an OH group in its molecular unit and being insoluble or sparingly soluble in water.

2. The watercolor ink according to claim 1, wherein said second solvent is at least one member selected from the group consisting of 2-ethyl-1,6-hexane diol, diethylene glycol hexyl ether, ethylene oxide adducts of acetylene glycol and ethylene glycol benzyl ether.

* * * * *